(12) United States Patent
Packirisamy et al.

(10) Patent No.: US 10,104,247 B2
(45) Date of Patent: Oct. 16, 2018

(54) METHOD AND APPARATUS FOR AUTOMATICALLY TRACKING PRINT HISTORY OF DOCUMENTS STORED ON REMOVABLE STORAGE DEVICE

(71) Applicant: Xerox Corporation, Norwalk, CT (US)

(72) Inventors: Vinothraja Packirisamy, Tamilnadu (IN); Jyoti Agarwal, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/221,695

(22) Filed: Jul. 28, 2016

(65) Prior Publication Data

US 2018/0034984 A1 Feb. 1, 2018

(51) Int. Cl.
G06F 3/12 (2006.01)
H04N 1/00 (2006.01)
H04N 1/32 (2006.01)

(52) U.S. Cl.
CPC ..... *H04N 1/00339* (2013.01); *H04N 1/00005* (2013.01); *H04N 1/00037* (2013.01); *H04N 1/32085* (2013.01); *H04N 2201/0094* (2013.01); *H04N 2201/3242* (2013.01)

(58) Field of Classification Search
CPC .................................................. H04N 1/00339
See application file for complete search history.

(56) References Cited

U.S. PATENT DOCUMENTS

| | | | |
|---|---|---|---|
| 5,860,066 A | 1/1999 | Rouse | |
| 5,969,826 A | 10/1999 | Dash et al. | |
| 7,844,749 B2 | 11/2010 | Tredoux et al. | |
| 7,869,063 B2 | 1/2011 | Fukano | |
| RE42,290 E | 4/2011 | Ogino | |
| 7,933,035 B2 | 4/2011 | Okada et al. | |
| 7,952,731 B2 | 5/2011 | Utsunomiya et al. | |
| 7,969,593 B2 | 6/2011 | Toda | |
| 8,115,949 B2 | 2/2012 | Toda | |
| 8,441,666 B2 | 5/2013 | Tomii et al. | |
| 8,599,395 B2 | 12/2013 | Sasakura | |
| 8,817,319 B2 | 8/2014 | Martin | |
| 9,009,359 B2 | 4/2015 | Ashok et al. | |
| 9,185,245 B2 | 11/2015 | Miyachi et al. | |
| 9,245,130 B2 | 1/2016 | Ashok et al. | |
| 9,245,131 B2 | 1/2016 | Ashok et al. | |

(Continued)

*Primary Examiner* — King Poon
*Assistant Examiner* — Michael Burleson
(74) *Attorney, Agent, or Firm* — Fox Rothschild LLP (57) ABSTRACT

A method for printing documents includes detecting a trigger event when a portable memory device is communicatively connected to a print device. The print device is in communication with a data store that contains print history identifying one or more files printed using one or more print devices. The method includes receiving an instruction to print a document file stored on the portable memory device, identifying a property associated with the document file, and comparing the property associated with the document file to the print history to determine if a previously printed document in the print history is substantially similar to the document file. If a previously printed document in the print history is substantially similar to the document file, before printing the document causing a user interface to output a prompt that the document file has previously been printed, otherwise causing the print device to print the document.

30 Claims, 6 Drawing Sheets

(56) References Cited

U.S. PATENT DOCUMENTS

| | | | |
|---|---|---|---|
| 9,661,170 B2 | 5/2017 | Mitsuyama et al. | |
| 9,674,383 B2 | 6/2017 | Suzuki | |
| 9,727,288 B2 | 8/2017 | Kesavan et al. | |
| 9,740,447 B1* | 8/2017 | Krishnasamy | G06F 3/1273 |
| 9,800,752 B2 | 10/2017 | Hirasawa | |
| 2005/0051942 A1 | 3/2005 | Kubo et al. | |
| 2006/0132841 A1* | 6/2006 | Park | H04N 1/00278 |
| | | | 358/1.15 |
| 2006/0221372 A1 | 10/2006 | Onishi et al. | |
| 2006/0268310 A1 | 11/2006 | Tamai et al. | |
| 2007/0109600 A1 | 5/2007 | Ren et al. | |
| 2007/0229899 A1* | 10/2007 | Okuda | G06F 3/1204 |
| | | | 358/1.16 |
| 2008/0080001 A1 | 4/2008 | Yamada | |
| 2008/0198412 A1 | 8/2008 | Yamada | |
| 2009/0128862 A1 | 5/2009 | Nolepa et al. | |
| 2009/0241120 A1 | 9/2009 | Nam et al. | |
| 2010/0188682 A1 | 7/2010 | Shirai | |
| 2010/0231968 A1 | 9/2010 | Hirasawa et al. | |
| 2011/0085205 A1 | 4/2011 | Ouchi | |
| 2011/0090533 A1* | 4/2011 | Shimizu | G06F 3/1222 |
| | | | 358/1.15 |
| 2011/0242580 A1 | 10/2011 | Tran | |
| 2011/0292430 A1 | 12/2011 | Kang et al. | |
| 2012/0069375 A1 | 3/2012 | Sasakura | |
| 2012/0140266 A1 | 6/2012 | Takayama | |
| 2012/0158956 A1 | 6/2012 | Sako | |
| 2012/0194850 A1 | 8/2012 | K. et al. | |
| 2012/0218605 A1* | 8/2012 | Yamada | G06F 3/1204 |
| | | | 358/1.17 |
| 2012/0257232 A1* | 10/2012 | Koike | G06F 3/121 |
| | | | 358/1.12 |
| 2012/0307316 A1 | 12/2012 | De Muelenaere et al. | |
| 2013/0120799 A1 | 5/2013 | Maeda | |
| 2016/0086068 A1 | 3/2016 | Nakamura | |
| 2016/0241736 A1 | 8/2016 | Saluja et al. | |
| 2016/0253130 A1 | 9/2016 | Rajalingam et al. | |
| 2017/0139652 A1 | 5/2017 | Kesavan et al. | |

\* cited by examiner

FIG. 6

METHOD AND APPARATUS FOR AUTOMATICALLY TRACKING PRINT HISTORY OF DOCUMENTS STORED ON REMOVABLE STORAGE DEVICE

BACKGROUND

Typically, a host device such as a computing device provides print data in a suitable format to a print device. However, a print device may also receive print data directly from a portable memory device such as a universal serial bus (USB). Specifically, data stored on a portable memory device may not necessarily be stored in a computing device and the portable memory device can be directly connected to the print device for printing of print data.

When a print device receives print data from a computing device, the computing device tracks and saves print history for a document and may provide various alerts to the user (such as in the case of duplicate printing of the same document). However, current portable memory devices do not have the capability to track or save print history data. Hence, a user does not have any information about print history settings, printed document identity, or the like. For example, a user cannot distinguish between recently printed documents and the other unprinted files, which may lead to duplication of the printed documents.

While a print device may save print history data for a document, a user must access the completed job history data of the print device to access and view the print history data, including identity of files that have been recently printed. Moreover, a print device only saves print history data for a document for as long as the print device is connected to the portable memory device. When the print device is disconnected from the portable memory device the print history data is erased from the print device memory.

This document describes a system that may address at least some of the issues described above.

SUMMARY

In an embodiment, a system (and method) for automatically tracking print history of a document stored on a portable memory device may include a print device in communication with a data store that contains a print history identifying one or more files printed using one or more print devices. The print device may further include a communication circuit for communicating with the data store and obtaining information from the print history, a port for communicating with a portable memory device, a print engine, a processing device communicatively coupled to the port and the print engine, and a non-transitory, computer-readable medium containing programming instructions. The system may detect a trigger event by determining that a portable memory device has become communicatively connected to the port. Upon detecting the trigger event, the system may access the print history and automatically identify a document print history corresponding to a document stored on the portable memory device. In an embodiment, automatically identifying the document print history may include determining if at least one previously printed document in the print history is substantially similar to the document stored on the portable memory device. The system may then cause a user interface to output an indication to a user, wherein the indication comprises the document print history.

In an embodiment, accessing the print history and automatically identify the document print history corresponding to the document stored on the portable memory device may include determining if at least one previously printed document in the print history is substantially similar to the document stored on the portable memory device by: extracting a property associated with the document stored on the portable memory device, and comparing the property with a corresponding property of one or more previously printed documents in the print history. In an embodiment, the property associated with the document may be selected from one or more of the following: a filename, a document size, number of pages of the document, contents of the document, a document format, print settings information for the document, date of creation of the document, raster image data of the document, an identification of the portable memory device, or an identification of a user of the portable memory device.

In some embodiments, the system may identify a subset of the print history using one or more of the following: an identification of the portable memory device, an identification of a user of the portable memory device, or a threshold time before detecting the trigger event. The system may then use the subset of the print history to automatically identify a document print history corresponding to a document stored on the portable memory device.

In at least one embodiment, the document print history may include information relating to whether or not the document has previously been printed. In an embodiment, the indication may include a count of a number of times the document has previously been printed.

In another aspect, a document printing system may include a print device in communication with a data store that contains a print history identifying one or more files printed using one or more print devices. In an embodiment, the print device may include a communication circuit for communicating with the data store and obtaining information from the print history, a port for communicating with a portable memory device, a print engine, a processing device communicatively coupled to the port and the print engine, and a non-transitory, computer-readable medium containing programming instructions. In an embodiment, the system may detect a trigger event by determining that a portable memory device has become communicatively connected to the port; receive an instruction to print documents corresponding to a document file stored on the portable memory device; and identify a property associated with the document file stored on the portable memory device. Upon detecting the trigger event and receiving the print instruction, the system may access the print history and automatically compare the property associated with the document file to the print history to determine if at least one previously printed document in the print history is substantially similar to the document file. If at least one previously printed document in the print history is substantially similar to the document file, the system may cause a user interface to output a prompt that the document file has previously been printed before printing a document for the document file. However, the system may cause the print engine to print the document for the document file without causing a user interface to output an indication that the document file has previously been printed, if no previously printed document in the print history is substantially similar to the document file.

In an embodiment, the property associated with the document may be selected from one or more of the following: a filename, a document size, number of pages of the document, contents of the document, a document format, print settings information for the document, date of creation of the document, raster image data of the document, an identification of the portable memory device, or an identification of a user of the portable memory device.

In at least one embodiment, for the document file with at least one previously printed document in the print history that is substantially similar to that document file, the system may extract from the print history an indication of a number of times that the document has previously been printed before printing the document for the document file, and cause the user interface to output the number of times with the indication that the document file has previously been printed. Additionally and/or alternatively, for the document file with at least one previously printed document in the print history that is substantially similar to that document file, the system may cause the user interface to output a prompt, upon receipt of a positive response to the prompt, cause the print engine to print the document. The prompt may include a question asking the user whether the print engine should re-print the document. The system may send a communication to the data store to update the print history to increment a number of times that the document has previously been printed after printing the document. Additionally and/or alternatively, the system may also send a communication to the data store to update the print history to include a timestamp indicating a most recent time at which the document has been printed after printing the document.

In some embodiments, for the document file that does not have a previously printed document in the print history that is substantially similar to the document file, the system may send a communication to the data store to update the print history to include a filename associated with the document file along with an indication that the document for that document file has been printed, after printing the document for the document file. Additionally and/or alternatively, the system may send a communication to the data store to update the print history to include a timestamp indicating a time at which the document has been printed.

In an embodiment, the instruction to print documents (received by the system) may include a selection of a print driver corresponding to a command to print one or more document files from the portable memory device. In some embodiments, the instruction to print documents may also include automatically detecting that the portable memory device contains one or more document files having filenames that are in the print history.

In yet another aspect, a method (and system) for printing documents may include detecting a trigger event by determining that a portable memory device has become communicatively connected to a port of a print device. The print device may be in communication with a data store that contains a print history identifying one or more files printed using one or more print devices. The method may further include receiving an instruction to print documents corresponding to a document file stored on the portable memory device, upon detecting the trigger event and receiving the print instruction, identifying a print history file stored on the portable memory device that contains information relating to a print history of one or more document files stored on the portable memory device, and determining whether the print history file is accurate by comparing the print history file to the print history contained in the data store to. The method may further include in response to determining that the print history file is not accurate: identifying a property associated with the document file stored on the portable memory device, accessing the print history stored on the data store and automatically comparing the property associated with the document file to the print history to determine if at least one previously printed document in the print history is substantially similar to the document file, if at least one previously printed document in the print history is substantially similar to the document file causing a user interface to output a prompt that the document file has previously been printed before printing a document for the document file. Alternatively, if no previously printed document in the print history is substantially similar to the document file, causing the print device to print the document for the document file without causing a user interface to output an indication that the document file has previously been printed. Alternatively and/or additionally, in response to determining that the print history file is accurate: analyzing the print history file to determine if the document for the document file has previously been printed, if the document for the document file has previously been printed, causing a user interface to output a prompt that the document file has previously been printed before printing the document for the document file, and if the document for the document file has not previously been printed, causing the print device to print the document for the document file without causing a user interface to output an indication that the document file has previously been printed.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "automatically" refers to causing a machine to perform an action without requiring any user interaction, such as requiring the user to push a button or enter a command, before the machine will perform the action.

A "computer" or "computing device" refers to a device that includes a processor and non-transitory, computer-readable memory. The memory may contain programming instructions that, when executed by the processor, cause the computing device to perform one or more operations according to the programming instructions. Examples of computing devices include personal computers, servers, mainframes, gaming systems, televisions, and portable memory devices such as smartphones, smart watches, wearable electronic devices, digital cameras, fitness tracking devices, tablet computers, laptop computers, media players and the like.

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

The term "document" refers to a set of content that provides information, the content including characters (i.e., text, numbers and/or symbols) and/or images. The term "document" may include a digital document file, a Web page, a newsgroup posting, a picture, media, hyperlinks, etc. The document may, for example, include one or more areas comprising characters, and one or more other areas consisting of images. The characters, for example, may include narrative text sections of some length, as well as titles and captions. A document may be an electronic representation of a physical document that contains one or multiple pages.

The term "print device" refers to a machine having hardware capable of reading a digital document file, and use the information from the file and associated print instructions to print a physical document on a substrate. Components of a print device typically include a print engine, which includes print hardware such as a print head, components such as a print cartridge containing ink, toner or another print material, as well as a document feeding system configured to pass a substrate through the print device so that the print head can print characters and/or images on the substrate. A print device also includes a processor that can cause a print engine of the print device to print a document. Additionally, the print device includes a memory unit for storage of the documents, portions of the document, print history data, or the like. Any suitable print device can be used including, but not limited to, inkjet and laser print devices and multifunction devices.

The term "print history" refers to information that includes details of each print instance, such as the date and time a document is printed, the print device used, identification of the document printed (such as a file name), metadata associated with a portable memory device from which a document is printed, metadata associated with a user printing the document, number of copies printed, print settings used for printing a document, or the like. In one embodiment, the print history may be stored in the data store in any of the conventional format, such as in a file system of the operating system of the server or in a database structure, such as in a SQL database, or as a flat file.

A "processor" or a "processing device" is a hardware component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments.

The term "portable memory device" or a "removable storage device" refers to a portable device that has non-transitory storage medium capable of storing data, such as a universal serial bus (USB) flash drive, a secure digital (SD) card or microSD card, a portable hard disk, a portable media player or any other external storage device that has such storing capability. In various embodiments, the portable memory device does not need to include a processor. The portable memory device will typically have a file system. The portable memory device will include a data transfer device, such as a USB connector for a USB drive, input/output ports of an SD card or a radio unit (transceiver) of a near-field communication device such as a Bluetooth device.

Figure 1:
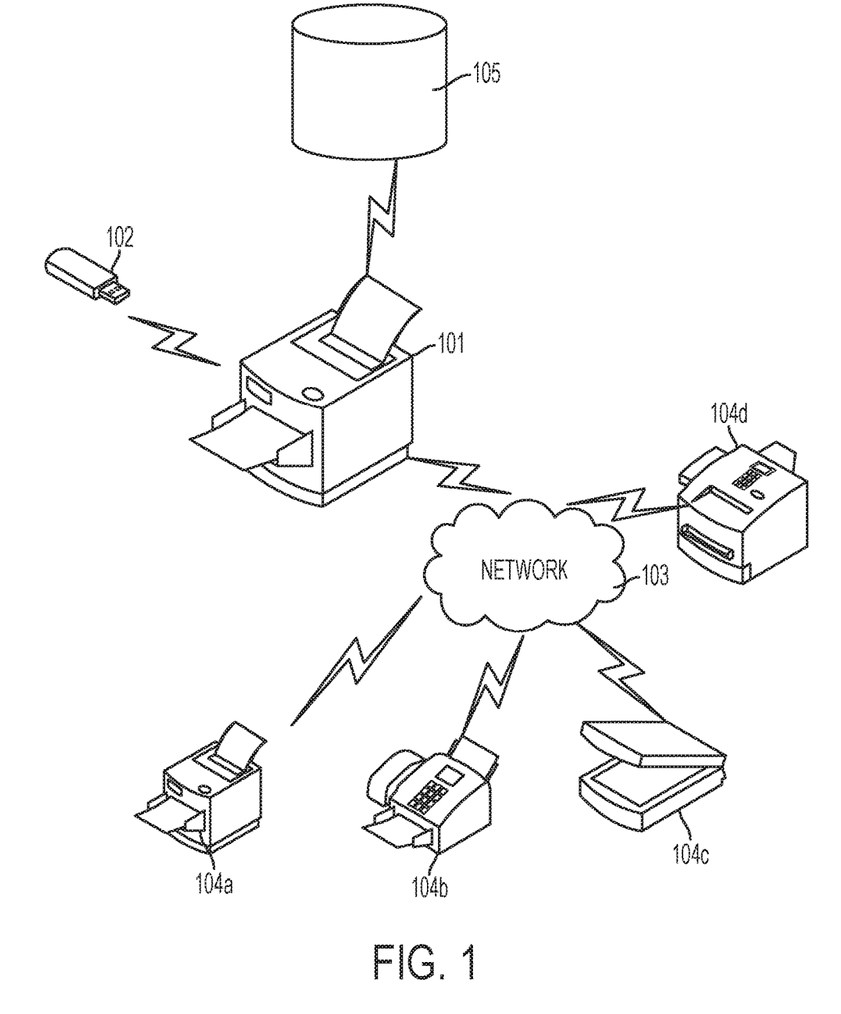
FIG. 1 illustrates an example system for automatically tracking print history of documents stored on a portable memory device, according to an embodiment.

FIG. 1 illustrates an example system for automatically tracking print history of documents stored on portable memory device. As shown in FIG. 1, a print device 101 may include at least one port (not shown) configured to receive a portable memory device 102. It will be appreciated by one skilled in the art that the operation of a port configured to receive a portable memory device is platform independent with respect to the print device. Additionally and/or alternatively, the print device 101 may be communicatively coupled to the portable memory device 102 through wireless communication such as via near-field communication (NFC), Wi-Fi, Bluetooth, or the like. The print device 101 may be configured to read data stored on the portable memory device 102.

In one embodiment, print device 101 may also be configured to detect a trigger event when a portable memory device is plugged into and/or otherwise communicatively connected to the print device. For example, the print device 101 may include an event trigger circuit that triggers the print device to perform certain operations. In an embodiment, the event trigger circuit may be communicatively coupled to the port configured to receive a portable memory device. When a portable memory device is plugged into the port, the event trigger circuit may detect the status change of the port and subsequently trigger the print device to perform the designation actions (discussed below in detail). Alternatively and/or additionally, the event trigger circuit may monitor the wireless communication components of the print device to detect wireless coupling of the portable memory device with the print device via NFC, Wi-Fi, Bluetooth, or the like.

In an embodiment, a print device 101 may include a user interface (not shown here), which may be employed to select features and enter other data to, for example, the print device. Such a user interface may include, for example, a touch screen (having touch activated keys), a keyboard, a keypad, a display, a microphone, a speaker, or the like, and software for presenting prompts to a user and receiving input from the user via the hardware.

In certain embodiments, the print device 101 may also include means for user authentication. The print device, for example, may be connected to an external user authentication system, such as a smart card reader, or may be configured to include internal user identification methods now or hereafter known to those skilled in the art.

In an embodiment, the print device 101 may save print history data in a memory unit residing locally on the print device. Additionally and/or alternatively, the print device 101 may be in electronic communication with one or more remote data storage units 105 (such as servers), and may save print history data on the one or more remote data storage units 105. In an embodiment, the system may only retain print history data for pre-defined time period and may periodically update the print history data which is not within the pre-defined time period.

The print device may be in communication with one or more other electronic devices such as another print device 104a, a fax machine 104b, a scanner 104c, a multifunction device 104d or the like, via a network 103. Network 103 may be a wired or wireless connection such as Internet, intranet, a local area network, a wide area network, cellular network, or any communication system over which the print device 101 may communicate with one or more of the other electronic devices 104*a*, 104*b*, 104*c* and 104*d*. In an embodiment, each of the one or more electronic devices 104*a*, 104*b*, 104*c* and 104*d* may be configured to include at least one port (not shown) configured to receive a portable memory device, and may be in communication with the one or more remote data storage units 105. Hence, the print device 101 and the one or more of the other electronic devices 104*a*, 104*b*, 104*c* and 104*d* may save and/or access information to and/or from the print history data (for the system) stored locally and/or on the one or more remote data storage units 105. For example, a print device of the system may access previously stored print history data even if it is taken offline for a period of time.

In an embodiment, the portable memory device 102 may store at least one printable document, access link of a printable document that is stored at a remote location, and/or operational instructions for the print device to perform various operations. For example the operational instructions may define one or more print settings for printing of the printable document. Examples of the print settings may include, without limitation, the desired number of copies, resolution settings, speed of printing, duplex printing or single-sided printing, size of the print documents, quality of print paper, finishing requirements, collating requirements, print quality, color settings, or the like.

Figure 2:
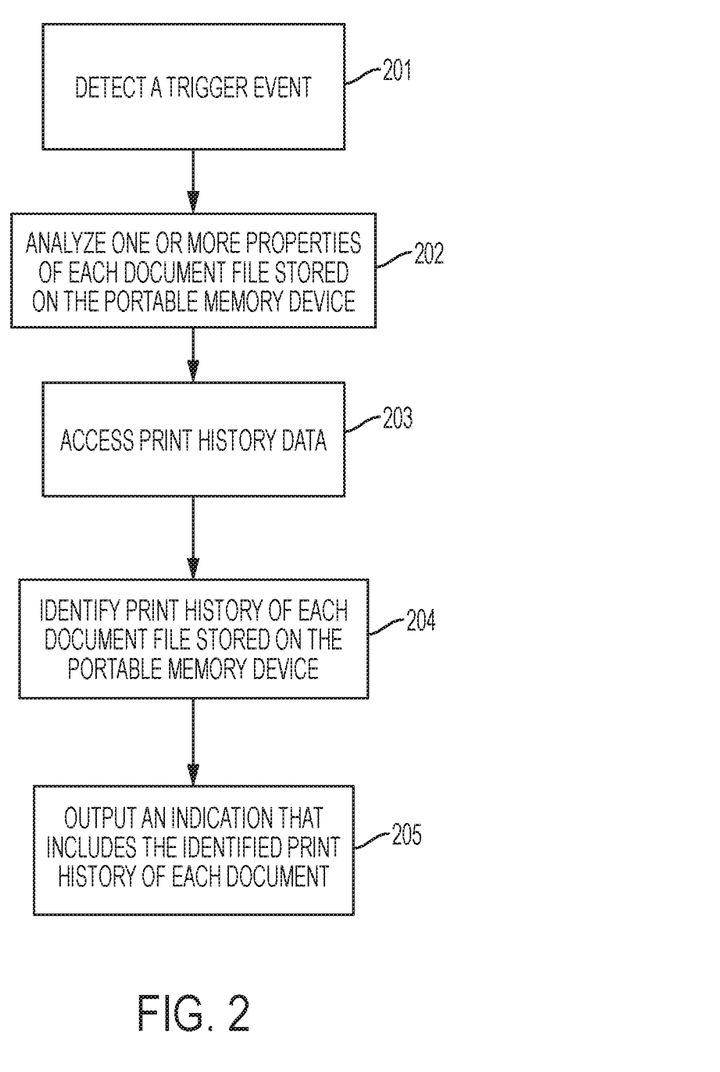
FIG. 2 illustrates a flowchart for an example method for automatically tracking print history of documents stored on a portable memory device, according to an embodiment.

FIG. 2 depicts a flowchart for an example method of automatically tracking print history of documents stored on a portable memory device. In an embodiment, in step 201 the system may detect a trigger event. In an embodiment, detecting the trigger event may include detecting that a portable memory device has been communicatively coupled to a print device (via a port and/or wirelessly). In an embodiment, the trigger event may be indicative that a user has initiated a print job. In an alternate embodiment, the trigger event may include receiving an instruction from a user to print a document from a portable memory device.

In an embodiment, upon detection of the trigger event the system may also receive authentication information from the portable memory device and/or a user associated with the portable memory. For example, the system may prompt a user to enter a username and/or a password upon detecting the trigger event. Alternatively, the system may automatically retrieve authentication information from the portable memory device such as a known identifier of the portable memory device and/or a user name and password.

In response to detecting the trigger event, the system may analyze 202 one or more properties of each document file stored on the portable memory device. In an embodiment, examples of the one or more properties may include, without limitation, document filename, document size, number of pages, document contents, document format, print settings information for the document, date of creation, raster image data of the document, an identification of the portable memory device, an identification of a user (author) printing the document, or the like.

In an embodiment, the system may then access 203 stored print history to identify 204 the print history of each document file stored on the portable memory device, including whether or not a document for the document file has already been printed. The system may identify the print history of each document file stored on the portable memory device by determining if at least one previously printed document in the print history is substantially similar to a document file stored on the portable memory device. The system may make the determination by comparing one or more properties of previously printed documents (in the print history) to the corresponding one or more properties of the document file stored on the portable memory device.

In an embodiment, the system may parse the complete print history data associated with the system to identify the print history of each document file stored on the portable memory device by determining if at least one previously printed document in the print history is substantially similar to a document file stored on the portable memory device.

In an alternate embodiment, the system may identify a subset of print history data corresponding to the portable memory device and/or a user associated with the portable memory device, and may only parse the subset of print history data to identify the print history of each document file stored on the portable memory device. For example, the system may retrieve an identifier associated with the portable memory device and/or the user associated with the portable memory device and may extract the subset of print history data using the identifier. Additionally and/or alternatively, the system may identify a subset of print history data within a particular time period before detection of the trigger event, and may only parse the subset of print history data to identify the print history of each document file stored on the portable memory device. For example, the system may only search print history data for a day, week, month, etc., before detection of the trigger event.

In an embodiment, the system may access a rule set to compare one or more properties of previously printed documents to the corresponding one or more properties of a document file stored on the portable memory device, to determine if at least one previously printed document in the print history is substantially similar to the document file stored on the portable memory device. For example, the rule set may provide that the system should compare the filenames of the previously printed documents in the print history with the filename of a document file stored on the portable memory device (i.e., determine if filename of a previously printed document is the same as the filename of a document file stored on the portable memory device). In an embodiment, the rule set may further provide that if the system identifies one or more previously printed documents that have the same file name, it should then compare other properties of the identified previously printed documents (such as file size, date of creation, raster image data, contents, or the like) with that of the document file stored on the portable memory device to determine a threshold similarity between the identified previously printed documents and the document file stored on the portable memory device.

Additionally and/or alternatively, the rule set may provide that if the system cannot identify any previously printed documents that have the same file name, it may compare other properties such as file size, date of creation, raster image data, contents, or the like, of the previously printed documents with that of a document file stored on the portable memory device. In an embodiment, the rule set may specify that the one or more properties be compared in a specific order (such as compare date of creation first, then raster data, and so on) to determine a threshold similarity with the document file stored on the portable memory device. The above example rule sets are provided by way of example only and it will be understood to those skilled in the art that other rule sets are within the scope of this disclosure. In an embodiment, a user may define one or more rule sets for making the above determination.

In an embodiment, the system may then provide 205 an indication to a user that includes identified print history of each document file stored on the portable memory device. The system may provide the indication via a user interface such as a display of a print device, or the like. In an embodiment, the indication may include information about each document file (and its corresponding print history) stored on the portable memory device such as, without limitation, the filename, the date and time of printing, number of copies printed, print settings, portable memory device identification, or the like. In an embodiment, the indication may include information about a folder (including one or more document files) stored on the portable memory device.

In an embodiment, the system may also include a count of the previously printed documents that are determined to be substantially similar to a document file on the portable memory device, in the indication provided to the user. In an embodiment, the system may only provide a count of the previously printed documents that are substantially similar to a document file on the portable memory device, and that have a date and time of printing within a threshold time before the detection of the trigger event. In an alternate embodiment, the system may provide a count of all the previously printed documents that are substantially similar to a document file on the portable memory device.

In an embodiment, the system may also store the identified print history for each document file in the portable memory device and/or the document itself.

Figure 3:
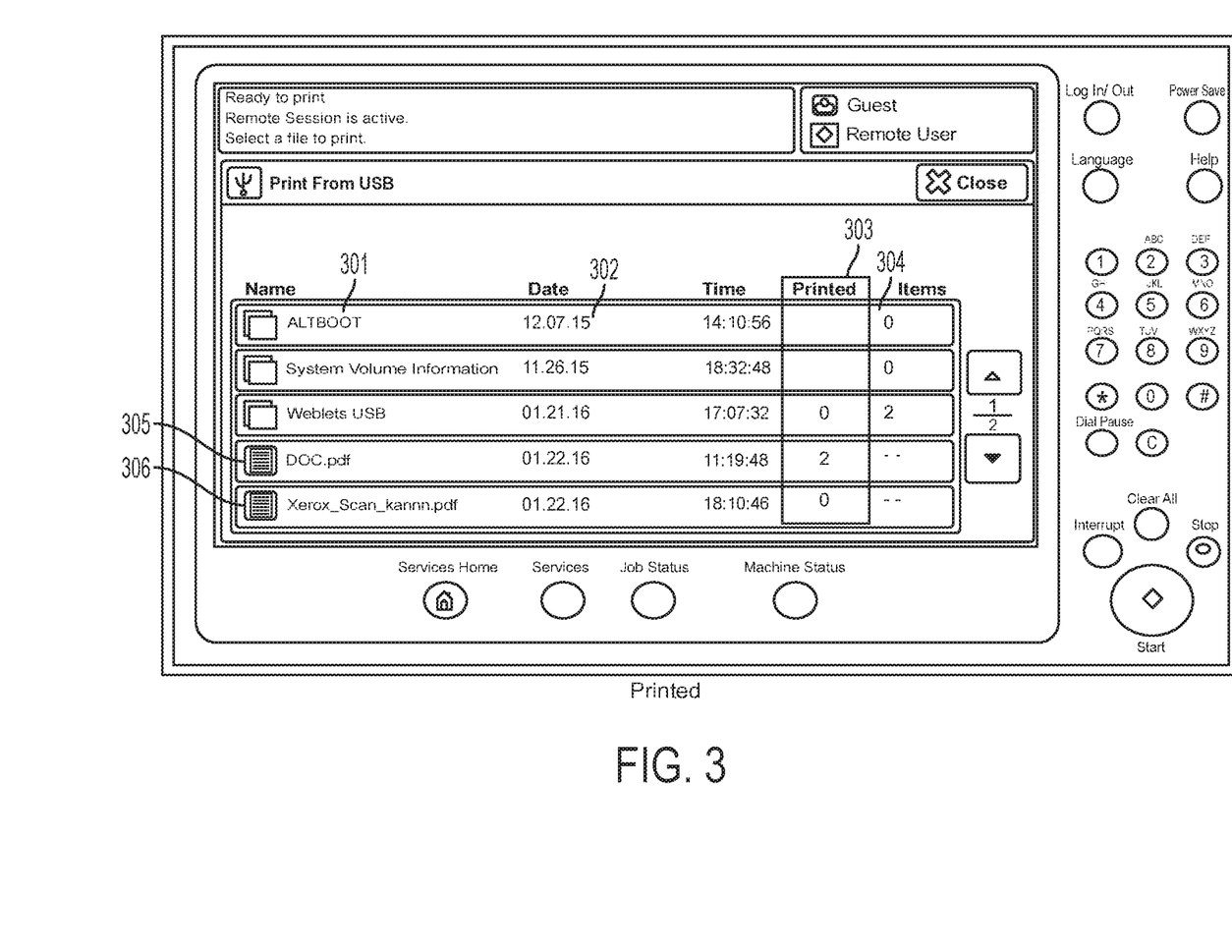
FIG. 3 illustrates an example of an indication provided to a user regarding the print history of documents stored on a portable memory device, according to one embodiment.

FIG. 3 illustrates an example of an indication provided by the system, where the indication includes information regarding whether or not one or more document files stored on a portable memory device have been previously printed. As shown in FIG. 3, the indication includes folder and/or document filenames 301, date of creation (or last modification) 302, number of times previously printed 303, and number of document files in a folder 304. The indication also provides that document file 306 has not been previously printed ("0" counts of previous printing), and document file 305 has been already been printed twice.

In an embodiment, the system may also update the print history data (corresponding to a portable memory device) by analyzing one or more properties of the previously printed documents in the print history and comparing them to all the document files stored in the portable memory device. If the one or more of the previously printed documents are not substantially similar to a document file stored on the portable memory device, the system may delete print history data corresponding to the one or more of the previously printed documents. In an embodiment, the system may use the example rule sets discussed above to determine if the one or more of the previously printed documents are substantially similar to a document file stored on the portable memory device.

Figure 4:
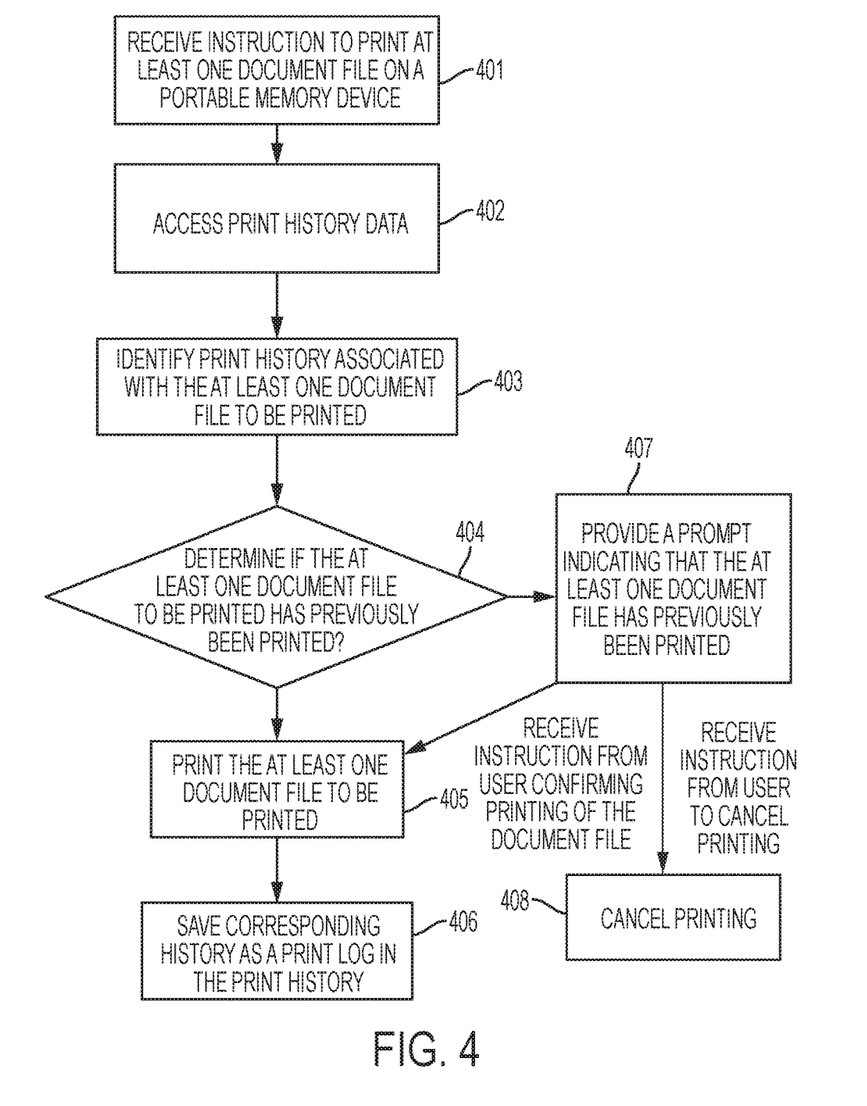
FIG. 4 illustrates a flowchart for an example method for providing a prompt to a user if a document to be printed has already been printed, according to an embodiment.

FIG. 4 illustrates a flowchart for an example method of using identified print history for a document file stored in a portable memory device to provide a prompt to a user if a document file to be printed has already been printed. In an embodiment, the system may receive 401 instructions to print at least one document file stored on a portable memory device. Alternatively and/or additionally, the system may automatically detect instructions to print at least one document file stored on the portable memory device by retrieving print instructions stored on the portable memory device. For example, a default file folder on the portable memory device or a root of the portable memory device file directory may include instructions relating to printing of at least one document stored on the portable memory device. Alternatively and/or additionally, the designated folder may be a default folder or may be the root of the portable memory device file directory. In one embodiment, the print instructions may be included in a print instruction file, such as in the XML format, and the print device may parse the XML print instruction file and extract relevant fields for print instructions. Alternatively and/or additionally, the print instructions may be stored in a non-transitory memory built in the print device. The print device may include program instructions that can retrieve print instructions from a default file on the portable memory device (e.g. scan-instruction-.xml) or may use default scan instructions stored in the print device.

In an embodiment, upon receiving the print instructions, the system may also receive authentication information from the portable memory device and/or a user associated with the portable memory. For example, the system may prompt a user to enter a username and/or a password upon detecting the trigger event. Alternatively, the system may automatically retrieve authentication information from the portable memory device such as a known identifier of the portable memory device and/or a user name and password.

In an embodiment, the system may then access 402 stored print history data to identify 403 print history associated with the at least one document file to be printed. In an embodiment, the system may identify print history associated with the at least one document file to be printed using the method described above with respect to FIG. 2.

In an embodiment, the system may analyze the identified print history associated with the at least one document file to be printed to determine 404 if the at least one document file to be printed has previously been printed. If the at least one document file to be printed has not previously been printed (i.e., the identified print history provides that none of the previously printed documents are substantially similar to the at least one document to be printed), the system may print 405 the at least one document file to be printed, to output a document. The system may also save 406 the corresponding information as a print log in the print history. Example information included in the print log may include, without limitation, the date and time of printing, number of copies printed, document filename, document size, number of pages, document contents, print settings information, date of creation, raster image data of the document, an identification of the portable memory device, an identification of a user (author) printing the document (i.e., associated with the portable memory device), or the like.

In an embodiment, if the system determines 404 that the at least one document file to be printed has previously been printed, the system may provide 407 a prompt to a user indicating that the document file has previously been printed and to confirm whether the user wishes continue printing the document file. The prompt may include information about the print history of the document file to be printed such as, without limitation, the date and time of printing, number of copies printed, print settings, or the like. The system may provide the prompt via a user interface such as a display of a print device, or the like.

In an embodiment, the user may review the information provided in the indication and/or the prompt and cancel printing of the at least one document file to be printed if the instruction to print was provided in error and will cause duplicate printing. The system may receive the instruction and cancel 408 printing of the at least one document file to be printed to avoid duplicate printing. Hence, the embodiments described in this document enable a user to track a print history of documents stored on a portable memory device, to help reduce duplicate printing of documents that were previously printed.

Alternatively, the user may provide an instruction confirming printing of the document file, if the instruction to print was not provided in error. The system may then print 405 the at least one document file to be printed to output a document, and may save 406 the corresponding information as a print log in the print history. The system thus updates the identified print history to increment a number of times that the document file has been printed. In an embodiment, the system may automatically retrieve print settings of the at least one previously printed document, and use the retrieved print settings for print the at least one document to be printed.

In an embodiment, the system may also determine if the date and time of previous printing instance(s) of the at least one document file to be printed is within a threshold time before the detection of the trigger event. The system may only provide the prompt 407 only if the date and time of previous printing instance(s) of the at least one document file to be printed is within a threshold time before the detection of the trigger event. If the date and time of previous print instance(s) is not within a threshold time period before the detection of the trigger event, the system may print the at least one document file to be printed, and may save the corresponding information as a print log in the print history.

Figure 5:
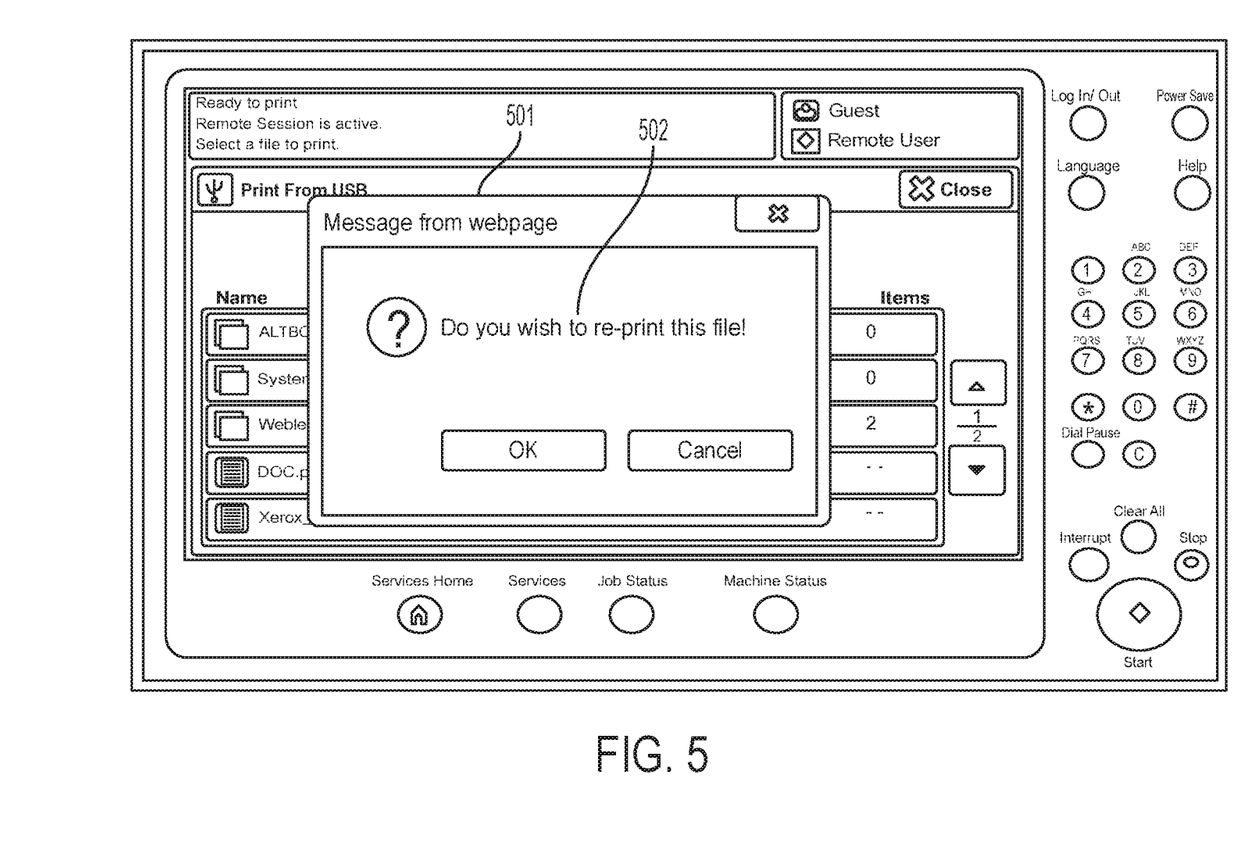
FIG. 5 illustrates an example of a prompt provided to a user, according to one embodiment.

FIG. 5 illustrates an example of a prompt 501 provided to a user who provided an instruction to print document, which had already been printed, to confirm 502 that the instruction was not provided in error, and to prevent duplicate printing.

In an alternate embodiment, when the system prints a document file stored on a portable memory device to output a printed document, the system may save the corresponding information as a print log in a print history file stored on the portable memory device itself. In an embodiment, a print history file stored on a portable memory device may include information relating to print history of one or more document files currently or previously stored on the portable memory device. Example information included in the print history file (for each document file) may include, without limitation, the date and time of printing, number of copies printed, document filename, document size, number of pages, document contents, print settings information, date of creation, raster image data of the document, an identification of a user (author) printing the document (i.e., associated with the portable memory device), an identification of a print device used to print the document file, or the like.

In an embodiment, when the system detects a triggering event (as discussed above with respect to FIG. 2) and/or receives an instruction to print a document file stored on a portable memory device, the system may extract the print history file stored on the portable memory device and compare it to print history stored on the system to determine whether or not information in the print history file stored on the portable memory device is accurate and/or current. The system may determine that the information in the print history file stored on the portable memory device is accurate and/or current if it matches the corresponding information in the print history stored on the system. In an embodiment, the system may compare the complete print history file stored on the portable memory device to the corresponding print history stored on the system to determine whether or not the print history file stored on the portable memory device is accurate and/or current. Alternatively and/or additionally, the system may only compare information associated with the document files for which instructions to print were received to the corresponding information in the print history stored on the system to determine whether or not the information (associated with the document files) saved in the print history file is accurate and/or current.

In an embodiment, if the system determines that the print history file and/or information associated with the document files for which instructions to print were received is not accurate and/or current, the system may use the print history stored on the system for automatically tracking print history of documents and/or for providing a prompt to a user if a document to be printed has already been printed (as discussed above with respect to FIGS. 2-5). Additionally and/or alternatively, the system may update the print history file stored on the portable electronic device such that information in the print history file matches the corresponding information in the print history stored on the system.

In an embodiment, if the if the system determines that the print history file and/or information associated with the document files for which instructions to print were received is accurate, the system may use the print history stored on the system and/or the print history file for automatically tracking print history of documents and/or for providing a prompt to a user if a document to be printed has already been printed. The system may determine that a document to be printed has previously been printed using methods discussed above with respect to FIGS. 2-5. For example, the system compare one or more properties of documents in the print history file to the corresponding one or more properties of a document file stored on the portable memory device, to determine if at least one document in the print history file is substantially similar to the document file stored on the portable memory device. The system may also update the print history stored on the system and/or the print history file when the system prints a document file stored on a portable memory device to output a printed document.

Figure 6:
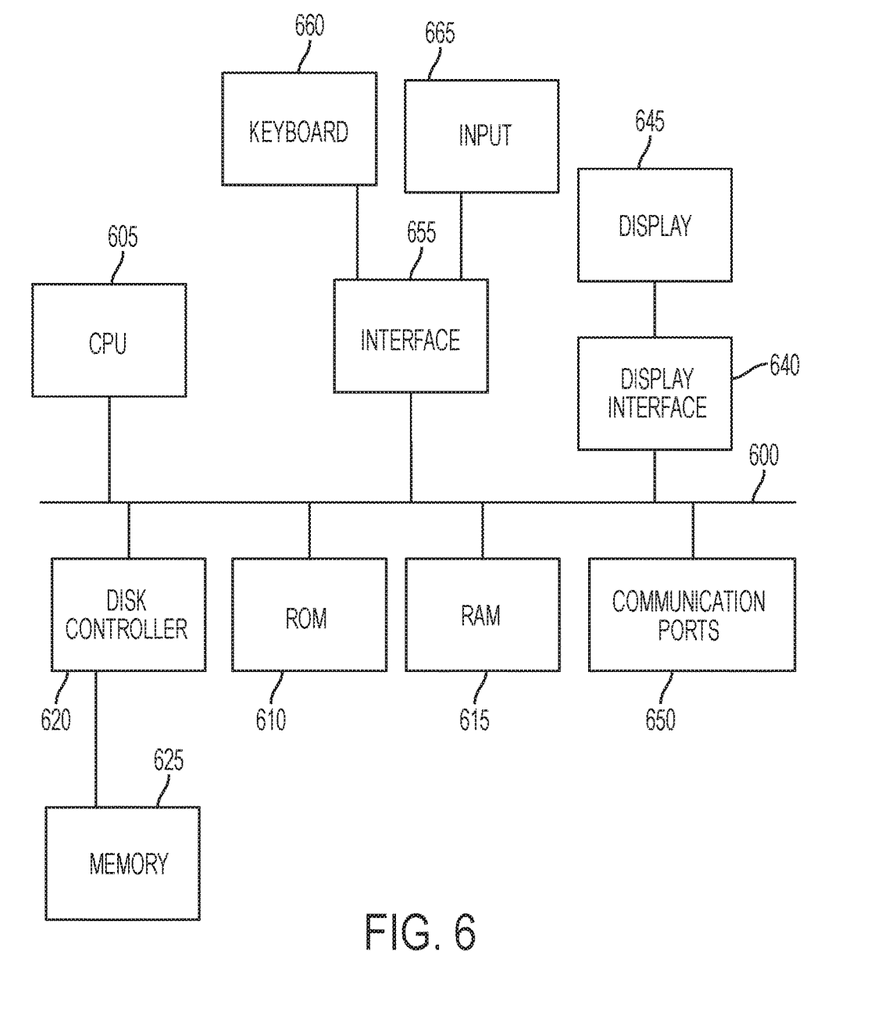
FIG. 6 is a block diagram of elements of a computing device on which the various systems and methods in this document could be implemented, according to an embodiment.

FIG. 6 depicts an example of internal hardware that may be included in any of the electronic components of the system, the print device or another electronic device in the system (in FIG. 1). An electrical bus 600 serves as the main information highway interconnecting the other illustrated components of the hardware. CPU 605 is the central processing unit of the system, representing a processor (which may be a single processing device or multiple processing devices) performing calculations and logic operations required to execute a program. CPU 605, alone or in conjunction with one or more of the other elements disclosed in FIG. 6, is a processing device, computing device or processor as such terms are used within this disclosure. Read only memory (ROM) 610 and random access memory (RAM) 615 constitute examples of memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 610 and/or the RAM 615. Optionally, the program instructions may be stored on a tangible computer readable medium such as a compact disk, a digital disk, flash memory, a memory card, a USB drive, an optical disc storage medium, a distributed storage medium such as a cloud-based architecture, and/or other recording medium.

A display interface 640 may permit information to be displayed on the display 645 in audio, visual, graphic or alphanumeric format. An audio interface and audio output (such as a speaker) also may be provided (not shown here). Communication with external devices may occur using various communication ports or devices 650 such as a portable memory device reader/writer, a transmitter and/or receiver, an antenna, an RFID tag and/or short-range or near-field communication circuitry. A communication port 650 may be attached to a communications network, such as the Internet or a local area network or a cellular telephone data network.

The hardware may also include an interface 665 which allows for receipt of data from input devices such as a keyboard 660 or other input device 655 such as a mouse, a joystick, a touch screen, a remote control, a pointing device, a video input device and/or an audio input device.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A system for automatically tracking print history of a document stored on a portable memory device, comprising:
   a print device in communication with a data store that contains a print history identifying one or more files printed using one or more print devices, the print device comprising:
      a communication circuit for communicating with the data store and obtaining information from the print history,
      a port for communicating with a portable memory device,
      a print engine,
      a processing device communicatively coupled to the port and the print engine, and
      a non-transitory, computer-readable medium containing programming instructions that are configured to cause the processing device to:
         detect a trigger event by determining that a portable memory device has become communicatively connected to the port;
         upon detecting the trigger event, access the print history and automatically identify a document print history corresponding to a document stored on the portable memory device, wherein automatically identifying the document print history comprises determining if at least one previously printed document in the print history is substantially similar to the document stored on the portable memory device; and
         cause a user interface to output an indication to a user, wherein the indication comprises the document print history.

2. The system of claim 1, wherein the programming instructions that are configured to cause the processing device to access the print history and automatically identify the document print history corresponding to the document stored on the portable memory device, further comprise programming instructions that cause the processing device to determine if at least one previously printed document in the print history is substantially similar to the document stored on the portable memory device by:
   extracting a property associated with the document stored on the portable memory device; and
   comparing the property with a corresponding property of one or more previously printed documents in the print history.

3. The system of claim 2, wherein the property associated with the document is selected from one or more of the following: a filename; a document size; number of pages of the document; contents of the document; a document format; print settings information for the document; date of creation of the document; raster image data of the document; an identification of the portable memory device; or an identification of a user of the portable memory device.

4. The system of claim 1, further comprising additional programming instructions that are configured to cause the processing device to:
   identify a subset of the print history using one or more of the following:
      an identification of the portable memory device,
      an identification of a user of the portable memory device, or
      a threshold time before detecting the trigger event; and
   use the subset of the print history to automatically identify a document print history corresponding to a document stored on the portable memory device.

5. The system of claim 1, wherein the document print history comprises information relating to whether or not the document has previously been printed.

6. The system of claim 5, wherein the indication further comprises a count of a number of times the document has previously been printed.

7. A document printing system, comprising:
   a print device in communication with a data store that contains a print history identifying one or more files printed using one or more print devices, the print device comprising:
      a communication circuit for communicating with the data store and obtaining information from the print history,
      a port for communicating with a portable memory device,
      a print engine,
      a processing device communicatively coupled to the port and the print engine, and
      a non-transitory, computer-readable medium containing programming instructions that are configured to cause the processing device to:
         detect a trigger event by determining that a portable memory device has become communicatively connected to the port;
         receive an instruction to print documents corresponding to a document file stored on the portable memory device;
         identify a property associated with the document file stored on the portable memory device;
         upon detecting the trigger event and receiving the print instruction, access the print history and automatically compare the property associated with the document file to the print history to determine if at least one previously printed document in the print history is substantially similar to the document file;
         if at least one previously printed document in the print history is substantially similar to the document file, before printing a document for the document file cause a user interface to output a prompt that the document file has previously been printed; and if no previously printed document in the print history is substantially similar to the document file, cause the print engine to print the document for the document file without causing a user interface to output an indication that the document file has previously been printed.

8. The system of claim 7, wherein the property associated with the document file comprises one or more of the following: a filename, a document size, number of pages of the document, contents of the document, a document format, print settings information for the document, date of creation of the document, raster image data of the document, an identification of the portable memory device, or an identification of a user of the portable memory device.

9. The system of claim 7, further comprising additional programming instructions that are configured to cause the processing device to, for the document file with at least one previously printed document in the print history that is substantially similar to that document file:

before printing the document for the document file, extract from the print history an indication of a number of times that the document has previously been printed; and cause the user interface to output the number of times with the indication that the document file has previously been printed.

10. The system of claim 7, further comprising additional programming instructions that are configured to cause the processing device to, for the document file with at least one previously printed document in the print history that is substantially similar to the document file:

cause the user interface to output a prompt, wherein the prompt comprises a question asking the user whether the print engine should re-print the document;

upon receipt of a positive response to the prompt, cause the print engine to print the document; and after printing the document, send a communication to the data store to update the print history to increment a number of times that the document has been printed.

11. The system of claim 7, further comprising additional programming instructions that are configured to cause the processing device to, for the document file with at least one previously printed document in the print history that is substantially similar to the document file:

cause the user interface to output a prompt, wherein the prompt comprises a question asking the user whether the print engine should re-print the document;

upon receipt of a positive response to the prompt, cause the print engine to print the document; and after printing the document, send a communication to the data store to update the print history to include a timestamp indicating a most recent time at which the document has been printed.

12. The system of claim 7, further comprising additional programming instructions that are configured to cause the processing device to, for the document file that does not have a previously printed document in the print history that is substantially similar to the document file:

after printing the document for the document file, send a communication to the data store to update the print history to include a filename associated with the document file along with an indication that the document for that document file has been printed.

13. The system of claim 12, further comprising additional programming instructions that are configured to cause the processing device to, after printing the document for the document file that does not have a previously printed document in the print history that is substantially similar to the document file:

send a communication to the data store to update the print history to include a timestamp indicating a time at which the document has been printed.

14. The system of claim 7, wherein the instruction to print documents further comprises a selection of a print driver corresponding to a command to print one or more document files from the portable memory device.

15. The system of claim 7, wherein the instruction to print documents further comprises automatically detecting that the portable memory device contains one or more document files having filenames that are in the print history.

16. A method for automatically tracking print history of a document stored on a portable memory device, comprising:

detecting a trigger event by determining that a portable memory device has become communicatively connected to a port of a print device, wherein the print device is in communication with a data store that contains a print history identifying one or more files printed using one or more print devices;

upon detecting the trigger event, accessing the print history and automatically identifying a document print history corresponding to a document stored on the portable memory device, wherein automatically identifying the document print history comprises determining if at least one previously printed document in the print history is substantially similar to the document stored on the portable memory device; and causing a user interface to output an indication to a user, wherein the indication comprises the document print history.

17. The method of claim 16, wherein accessing the print history and automatically identifying the document print history corresponding to the document stored on the portable memory device, further comprises determining if at least one previously printed document in the print history is substantially similar to the document stored on the portable memory device by:

extracting a property associated with the document stored on the portable memory device; and comparing the property with a corresponding property of one or more previously printed documents in the print history.

18. The method of claim 17, wherein the property associated with the document is selected from one or more of the following: a filename; a document size; number of pages of the document; contents of the document; a document format; print settings information for the document; date of creation of the document; raster image data of the document; an identification of the portable memory device; or an identification of a user of the portable memory device.

19. The method of claim 16, further comprising:

identifying a subset of the print history using one or more of the following:

an identification of the portable memory device, an identification of a user of the portable memory device, or a threshold time before detecting the trigger event; and using the subset of the print history to automatically identify a document print history corresponding to a document stored on the portable memory device.

20. The method of claim 16, wherein the document print history comprises information relating to whether or not the document has previously been printed.

21. The method of claim 20, wherein the indication further comprises a count of a number of times the document has previously been printed.

22. A method for printing documents comprising:
    detecting a trigger event by determining that a portable memory device has become communicatively connected to a port of a print device, wherein the print device is in communication with a data store that contains a print history identifying one or more files printed using one or more print devices;
    receiving an instruction to print documents corresponding to a document file stored on the portable memory device;
    identifying a property associated with the document file stored on the portable memory device;
    upon detecting the trigger event and receiving the print instruction, accessing the print history and automatically comparing the property associated with the document file to the print history to determine if at least one previously printed document in the print history is substantially similar to the document file;
    if at least one previously printed document in the print history is substantially similar to the document file, before printing a document for the document file causing a user interface to output a prompt that the document file has previously been printed; and
    if no previously printed document in the print history is substantially similar to the document file, causing the print device to print the document for the document file without causing a user interface to output an indication that the document file has previously been printed.

23. The method of claim 22, wherein the property associated with the document file comprises one or more of the following: a filename, a document size, number of pages of the document, contents of the document, a document format, print settings information for the document, date of creation of the document, raster image data of the document, an identification of the portable memory device, or an identification of a user of the portable memory device.

24. The method of claim 22, further comprising, for the document file with at least one previously printed document in the print history that is substantially similar to that document file:
    before printing the document for the document file, extracting from the print history an indication of a number of times that the document has previously been printed; and
    causing the user interface to output the number of times with the indication that the document file has previously been printed.

25. The method of claim 22, further comprising, for the document file with at least one previously printed document in the print history that is substantially similar to the document file:
    causing the user interface to output a prompt, wherein the prompt comprises a question asking the user whether the print engine should re-print the document;
    upon receipt of a positive response to the prompt, causing the print engine to print the document; and
    after printing the document, sending a communication to the data store to update the print history to increment a number of times that the document has been printed.

26. The method of claim 22, further comprising, for the document file with at least one previously printed document in the print history that is substantially similar to the document file:
    causing the user interface to output a prompt, wherein the prompt comprises a question asking the user whether the print engine should re-print the document;
    upon receipt of a positive response to the prompt, causing the print engine to print the document; and
    after printing the document, sending a communication to the data store to update the print history to include a timestamp indicating a most recent time at which the document has been printed.

27. The method of claim 22, further comprising, for the document file that does not have a previously printed document in the print history that is substantially similar to the document file:
    after printing the document for the document file, sending a communication to the data store to update the print history to include a filename associated with the document file along with an indication that the document for that document file has been printed.

28. The method of claim 27, further comprising, after printing the document for the document file that does not have a previously printed document in the print history that is substantially similar to the document file:
    sending a communication to the data store to update the print history to include a timestamp indicating a time at which the document has been printed.

29. The method of claim 22, wherein printing the document further comprises automatically detecting that the portable memory device contains one or more document files having filenames that are in the print history.

30. A method for printing documents comprising:
    detecting a trigger event by determining that a portable memory device has become communicatively connected to a port of a print device, wherein the print device is in communication with a data store that contains a print history identifying one or more files printed using one or more print devices;
    receiving an instruction to print documents corresponding to a document file stored on the portable memory device;
    upon detecting the trigger event and receiving the print instruction, identifying a print history file stored on the portable memory device that contains information relating to a print history of one or more document files stored on the portable memory device;
    determining whether the print history file is accurate by comparing the print history file to the print history contained in the data store to;
    in response to determining that the print history file is not accurate:
        identifying a property associated with the document file stored on the portable memory device,
        accessing the print history stored on the data store and automatically comparing the property associated with the document file to the print history to determine if at least one previously printed document in the print history is substantially similar to the document file,
        if at least one previously printed document in the print history is substantially similar to the document file, before printing a document for the document file causing a user interface to output a prompt that the document file has previously been printed, and if no previously printed document in the print history is substantially similar to the document file, causing the print device to print the document for the document file without causing a user interface to output an indication that the document file has previously been printed; and in response to determining that the print history file is accurate:
analyzing the print history file to determine if the document for the document file has previously been printed, if the document for the document file has previously been printed, before printing the document for the document file causing a user interface to output a prompt that the document file has previously been printed, and if the document for the document file has not previously been printed, causing the print device to print the document for the document file without causing a user interface to output an indication that the document file has previously been printed.

\* \* \* \* \*